（12） United States Patent
Minoo et al.

(10) Patent No.: US 10,506,232 B2
(45) Date of Patent: Dec. 10, 2019

(54) SYSTEM FOR RESHAPING AND CODING HIGH DYNAMIC RANGE AND WIDE COLOR GAMUT SEQUENCES

(71) Applicant: ARRIS Enterprises LLC, Suwanee, GA (US)

(72) Inventors: Koohyar Minoo, San Diego, CA (US); David M. Baylon, San Diego, CA (US); Zhouye Gu, San Diego, CA (US); Yue Yu, San Diego, CA (US); Ajay Luthra, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 309 days.

(21) Appl. No.: 15/274,710

(22) Filed: Sep. 23, 2016

(65) Prior Publication Data

US 2017/0085880 A1    Mar. 23, 2017

Related U.S. Application Data

(60) Provisional application No. 62/222,723, filed on Sep. 23, 2015, provisional application No. 62/241,087, (Continued)

(51) Int. Cl.
*H04N 7/12* (2006.01)
*H04N 19/124* (2014.01)
(Continued)

(52) U.S. Cl.
CPC ........... *H04N 19/124* (2014.11); *G06T 5/007* (2013.01); *H04N 19/174* (2014.11);
(Continued)

(58) Field of Classification Search
CPC .......... G06T 2207/20208; G06T 5/007; H04N 19/124; H04N 19/174; H04N 19/177;
(Continued)

(56) References Cited

U.S. PATENT DOCUMENTS 9,369,739 B2 *  6/2016  Mathur ................. H04N 19/98
9,451,274 B2    9/2016  Mertens
(Continued)

OTHER PUBLICATIONS

PCT Search Report & Written Opinion, RE: Application No. PCT/US2016/053521, dated Nov. 28, 2017.
(Continued)

*Primary Examiner* — Jessica M Prince
(74) *Attorney, Agent, or Firm* — Lori Anne D. Swanson

(57) ABSTRACT

A video data encoder generates a first metadata structure to describe one or more transfer functions to be applied by a decoder to reshape decoded video data into video data. The encoder segments a transfer function relative to P pivot points. It then allocates P cells in the metadata structure for storing the P pivot points. Each transfer function segment is fitted to a respective equation having N coefficients based on the order of the equation. The encoder allocates N+1 cells for each pivot point except for the $P^{th}$ pivot point and stores the number N in the first cell and the N coefficients in the remaining cells. The encoder generates a second metadata structure, associated with a video data set, that includes data identifying the transfer function to be applied to the video data set. The encoder encodes the video data including the first and second metadata structures.

17 Claims, 6 Drawing Sheets

Related U.S. Application Data filed on Oct. 13, 2015, provisional application No. 62/241,094, filed on Oct. 13, 2015, provisional application No. 62/242,272, filed on Oct. 15, 2015.

(51) Int. Cl.

| | | |
|---|---|---|
| *H04N 19/186* | (2014.01) | |
| *H04N 19/44* | (2014.01) | |
| *H04N 19/70* | (2014.01) | |
| *H04N 19/174* | (2014.01) | |
| *H04N 19/177* | (2014.01) | |
| *G06T 5/00* | (2006.01) | |
| *H04N 19/98* | (2014.01) | |

(52) U.S. Cl.
CPC ......... *H04N 19/177* (2014.11); *H04N 19/186* (2014.11); *H04N 19/44* (2014.11); *H04N 19/70* (2014.11); *H04N 19/98* (2014.11); *G06T 2207/20208* (2013.01)

(58) Field of Classification Search
CPC ...... H04N 19/186; H04N 19/44; H04N 19/70; H04N 19/98
USPC .................................................. 375/240.03
See application file for complete search history.

(56) References Cited

U.S. PATENT DOCUMENTS

| | | |
|---|---|---|
| 2015/0131904 A1 | 5/2015 | Hattori et al. |
| 2016/0005349 A1 | 1/2016 | Atkins et al. |
| 2016/0134872 A1* | 5/2016 | Su .................. H04N 19/176 |
| | | 375/240.03 |
| 2016/0316207 A1 | 10/2016 | Minoo et al. |
| 2018/0115774 A1* | 4/2018 | Su .................. H04N 19/136 |
| 2018/0278967 A1* | 9/2018 | Kerofsky ............ G06T 5/009 |

OTHER PUBLICATIONS

M. Winken, et al., "CE2: SVC bit-depth scalability", 24th JVT Meeting, 81st MPEG Meeting, (Joint Video Team of ISO/IEC JTC1/SC29/WG11 and ITU-T SG.16), Jul. 4, 2007, pp. 1-11.

Q. Chen, et al., "Near constant-time optimal piecewise LDR to HDR inverse tone mapping", Optomechatronic Micro/Nano Devices and Components III, Oct. 8-10, 2007, Proceedings of SPIE, vol. 9404, Feb. 27, 2015, pp. 1-2.

P. Andrivon, et al., "SEI message for Color Mapping Information," JCTVC-00074-r3, p. 1-14, Joint Collaborative Team on Video Coding (JCT-VC) of ITU-T SG 16 WP 3 and ISO/IEC JTC 1/SC 291WG 11, at the 17th Meeting, in Valencia, ES, on Apr. 2014.

K, Minoo, et al., "Description of the reshaper parameters derivation process in ETM reference software," JCTVC-W0031, p. 1-17, Joint Collaborative Team on Video Coding (JCT-VC) of ITU-T SG 16 WP 3 and ISO/IEC JTC 1/SC 29/WG 11, at the 23rd Meeting, in San Diego, USA, on Jan. 2016.

* cited by examiner

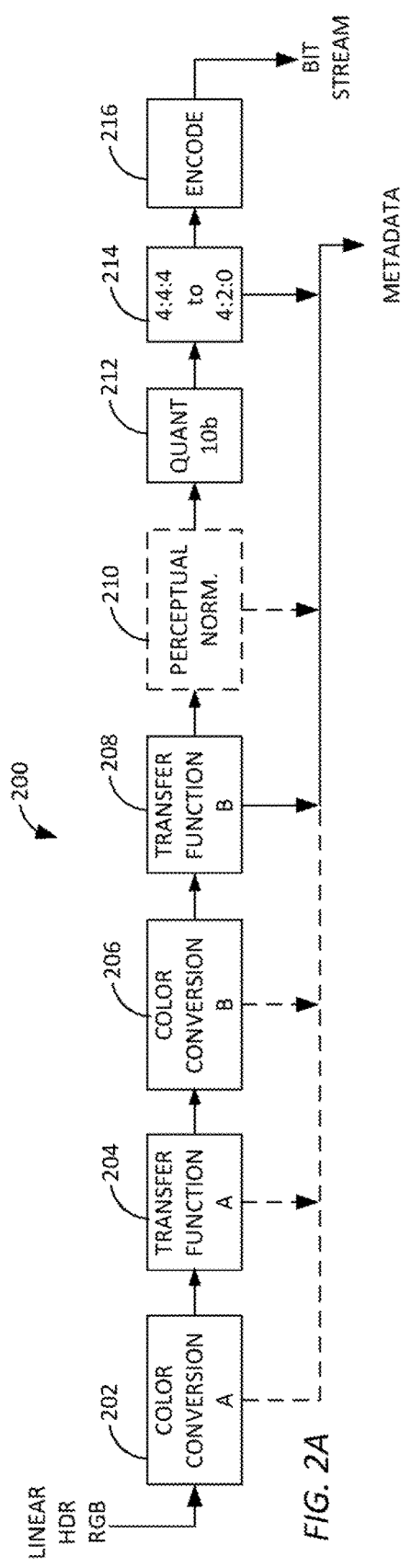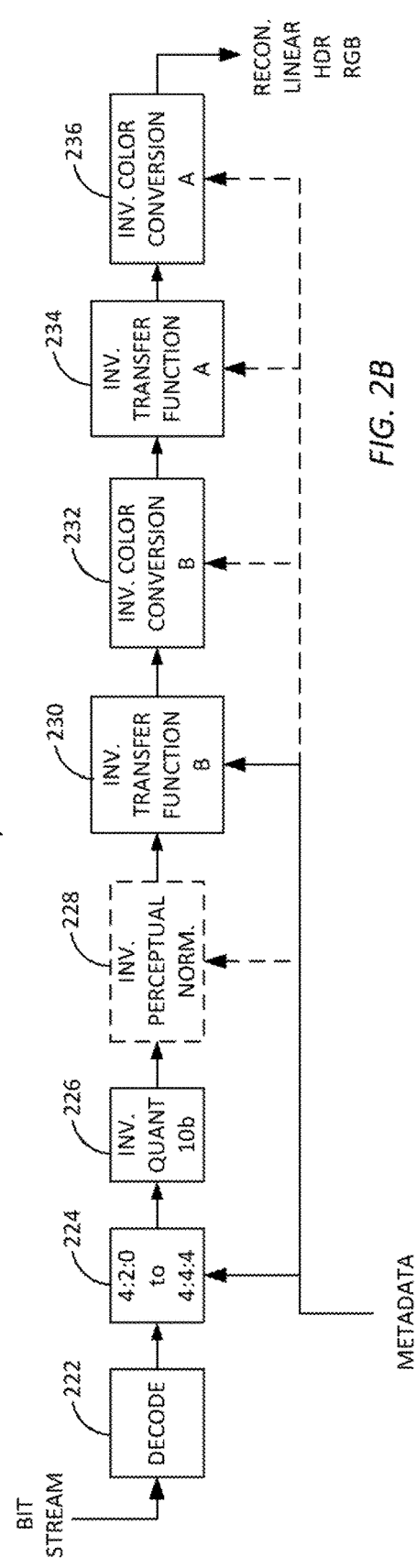
FIG. 2A
FIG. 2B reshaping parameters

602 —
604 — num_lut_gtr_1_flag=1
606 — num_lut – 2=1
608 — lut_id=0
num_lut_pivots-2=2
pivot_value
pivot_value  } 610
pivot_value
pivot_value  } 612
(pivot 0) poly_ord=1
(pivot 0) poly_coeff_0  } 614
(pivot 0) poly_coeff_1
(pivot 1) poly_ord=2  } 616
(pivot 1) poly_coeff_0
(pivot 1) poly_coeff_1  } 618
(pivot 1) poly_coeff_2
(pivot 2) poly_ord=1  } 620
(pivot 2) poly_coeff_0
(pivot 2) poly_coeff_1  } 622
lut_id=1
num_lut_pivots-2=2
pivot_0
pivot_1
pivot_2
pivot_3
(pivot 0) poly_ord=1
(pivot 0) poly_coeff_0
(pivot 0) poly_coeff_1
(pivot 1) poly_ord=2
(pivot 1) poly_coeff_0
(pivot 1) poly_coeff_1
(pivot 1) poly_coeff_2
(pivot 2) poly_ord=1
(pivot 2) poly_coeff_0
(pivot 2) poly_coeff_1
lut_id=2
⋮

*FIG. 6A* reshaping id

Y_lut_index
Cb_lut_index
Cr_lun_index

*FIG. 6B* reshaping parameters num_lut_gtr_1_flag=1
num_lut – 2=1
lut_id=0
num_lut_pivots-2=2
pivot_0
pivot_1
pivot_2
702 — pivot_3
704 — lut_offset_1
lut_offset_2
(pivot 0) poly_ord=1
(pivot 0) poly_coeff_0
(pivot 0) poly_coeff_1
(pivot 1) poly_ord=2
(pivot 1) poly_coeff_0
(pivot 1) poly_coeff_1
(pivot 1) poly_coeff_2
(pivot 2) poly_ord=1
(pivot 2) poly_coeff_0
(pivot 2) poly_coeff_1
lut_id=1
⋮

*FIG. 7A* reshaping id

706 —
708 — Y_lut_index
710 — Y_cross_chan_flag=1
712 — Y_cross_chan_index=0
Cb_lut_index
714 — Cb_cross_chan_flag=0
716 — Cr_lut_index
718 — Cr_cross_chan_flag=1
Cr_cross_chan_index=0
720

*FIG. 7B* reshaping id cross_chan_flag=0
lut_reshape_index[0]
lut_reshape_index[1]
lut_reshape_index[2]

*FIG. 7C* reshaping parameters

| |
|---|
| num_lut_gtr_1_flag=1 |
| num_lut − 2=1 |
| lut_id=0 |
| num_lut_pivots-2=2 |
| pivot_0 |
| pivot_1 |
| pivot_2 |
| pivot_3 |
| lut_offset_1 |
| lut_offset_2 |
| (pivot 0) poly_coeff_0 |
| (pivot 0) poly_coeff_1 |
| (pivot 0) poly_coeff_2 |
| (pivot 1) poly_coeff_2 |
| (pivot 2) poly_coeff_2 |
| lut_id=1 |
| num_lut_pivots-2=4 |
| pivot_0 |
| pivot_1 |
| pivot_2 |
| pivot_3 |
| pivot_4 |
| pivot_5 |
| lut_offset_1 |
| lut_offset_2 |
| (pivot 0) poly_coeff_0 |
| (pivot 0) poly_coeff_1 |
| (pivot 0) poly_coeff_2 |
| (pivot 1) poly_coeff_2 |
| (pivot 2) poly_coeff_2 |
| (pivot 3) poly_coeff_2 |
| (pivot 4) poly_coeff_2 |
| lut_id=2 |

SYSTEM FOR RESHAPING AND CODING HIGH DYNAMIC RANGE AND WIDE COLOR GAMUT SEQUENCES

This application claims priority under 35 U.S.C. § 119(e) from earlier filed U.S. Provisional Application Ser. No. 62/222,723, filed Sep. 23, 2015, Ser. No. 62/241,087 filed Oct. 13, 2015, 62/241,094 filed Oct. 13, 2015, and Ser. No. 62/242,272 filed Oct. 15, 2015 which are hereby incorporated by reference.

TECHNICAL FIELD

The present disclosure relates to the field of video encoding and decoding High Dynamic Range (HDR) and/or Wide Color Gamut (WCG) video sequences, particularly a method for encoding such sequences and for storing and transmitting a transfer function used to recover HDR and/or WCG video sequences from a decoded video sequence.

BACKGROUND

HDR video and WCG video provide greater ranges of luminance and color values than traditional Standard Dynamic Range (SDR) video. For example, traditional video can have a limited luminance and color range, such that details in shadows or highlights can be lost when images are captured, encoded, and/or displayed. In contrast, HDR and/or WCG video can capture a broader range of luminance and color information, allowing the video to appear more natural and closer to real life to the human eye.

However, many common video encoding and decoding schemes, such as MPEG-4 Advanced Video Coding (AVC) and High Efficiency Video Coding (HEVC), are not designed to directly handle HDR or WCG video. As such, HDR and WCG video information is normally converted into other formats before it can be encoded using one of these video compression algorithms.

For example, HDR video formats such as the EXR file format describe colors in the Red, Green, Blue (RGB) color space with 16-bit half-precision floating point values having 10 significant bits, 5 exponent bits and one sign bit. These values cover a broad range of potential intensity and color values. SDR video employs 8 or 10-bit integer values to express the colors of non-HDR and non WCG video. Many existing video compression algorithms are meant for use with SDR video and, thus, expect to receive 8 or 10-bit integer values. It may be difficult to quantize the 16-bit half-precision floating point color values into 10-bit values that the compression algorithms can work with without substantially reducing video dynamic range or introducing significant distortion.

Some encoders use a coding transfer function to convert linear values from the input video into non-linear values prior to uniform quantization. By way of a non-limiting example, a coding transfer function may include a gamma function that compresses luminance and/or color (chrominance) values at one or both ends of the quantization range so that a larger range may be represented by the 8 or 10 bit values provided to the encoder. However, even when an encoder uses a coding transfer function to convert linear input values into non-linear values, the coding transfer function may be fixed, such that it does not change dependent on the content of the input video. For example, an encoder's coding transfer function can be defined to statically map every possible input value in an HDR range, such as from 0 to 10,000 nits (candelas per square meter or $cd/m^2$), to specific non-linear values ranging from 0 to 255 for 8-bit values or 0 to 1023 for 10 bit values. When the input video contains input values in only a portion of that range, however, fixed mapping can lead to poor allocation of quantization levels resulting in quantization distortion in the reproduced image. For example, a picture primarily showing a blue sky can have many similar shades of blue, but those blue shades can occupy a small section of the overall range for which the coding transfer function is defined. As such, similar blue shades may be quantized into the same value. This quantization may be perceived by viewers as contouring or banding, where quantized shades of blue extend in bands across the sky displayed on their screen instead of a more natural transitions between the shades.

Additionally, psychophysical studies of the human visual system have shown that a viewer's sensitivity to contrast levels at a particular location can be more dependent on the average brightness of surrounding locations than the actual levels at the location itself. Many coding transfer functions, however, do not take this into account and instead use fixed conversion functions or tables that do not take characteristics of the surrounding pixels, into account.

SUMMARY

A video data encoder generates a first self-referential data structure containing metadata (hereinafter referred to as a metadata structure) to describe one or more transfer functions to be applied by a decoder to reshape decoded video data into video data. The encoder segments a transfer function relative to P pivot points and stores the value P in the structure. The decoder then allocates P cells in the metadata structure for storing the P pivot points. Each transfer function segment is fitted to a respective equation having N coefficients based on the order of the equation. The encoder allocates N+1 cells for each pivot point except for the $P^{th}$ pivot point and stores the number N in the first cell and the N coefficients in the remaining cells. The encoder generates a second metadata structure, associated with a video data set, that includes data identifying the transfer function to be applied to the video data set. The encoder encodes the video data including the first and second metadata structures.

BRIEF DESCRIPTION OF THE DRAWINGS

Further details of the present invention are explained with the help of the attached drawings in which:

FIGS. 2A and 2B depict a first example of a process for encoding an input HDR and/or WCG video sequence into a coded bit stream compatible with a non-HDR, non-WCG video encoder using up to two color volume conversion processes and two transfer functions, and decoding that coded bit stream into a decoded video with a complementary video decoder that uses inverse color volume conversion processes and transfer functions.

FIGS. 6A, 6B, 7A, 7B, 7C and 8 are data diagrams that illustrate storage of metadata describing the inverse coding transfer functions.

DETAILED DESCRIPTION

The example systems and methods described below adapt the coding transfer function, or otherwise convert and/or redistribute HDR and/or WCG video data to effectively compress the HDR and/or WCG video so that it may be quantized and encoded by a non-HDR, non-WCG encoder such as an HEVC (High Efficiency Video Coding), H.264/MPEG-4 AVC (Advanced Video Coding), or MPEG-2 encoder and then reconstituted to recover at least some of the HDR and/or WCG data at the receiver. The transfer functions may be based on the actual video content at the level of a group of pictures, a picture, or a sub-picture window of the input video. These video processes may be achieved by generating curves or tone maps of non-linear values that compress the color and/or intensity information actually present in temporal and/or spatial segments of the input video data instead of across a full range of potential values. As such, when the non-linear values are uniformly quantized, the noise and/or distortion introduced by uniform quantization can be minimized such that it is unlikely to be perceived by a human viewer. In addition, metadata information about the coding transfer function used to compress and encode the input video data is efficiently inserted into a self-referential metadata structure that is transmitted to decoders. The decoders recover this transfer function as a look-up table (LUT) to perform corresponding inverse operations when decoding the video data.

Figure 1:
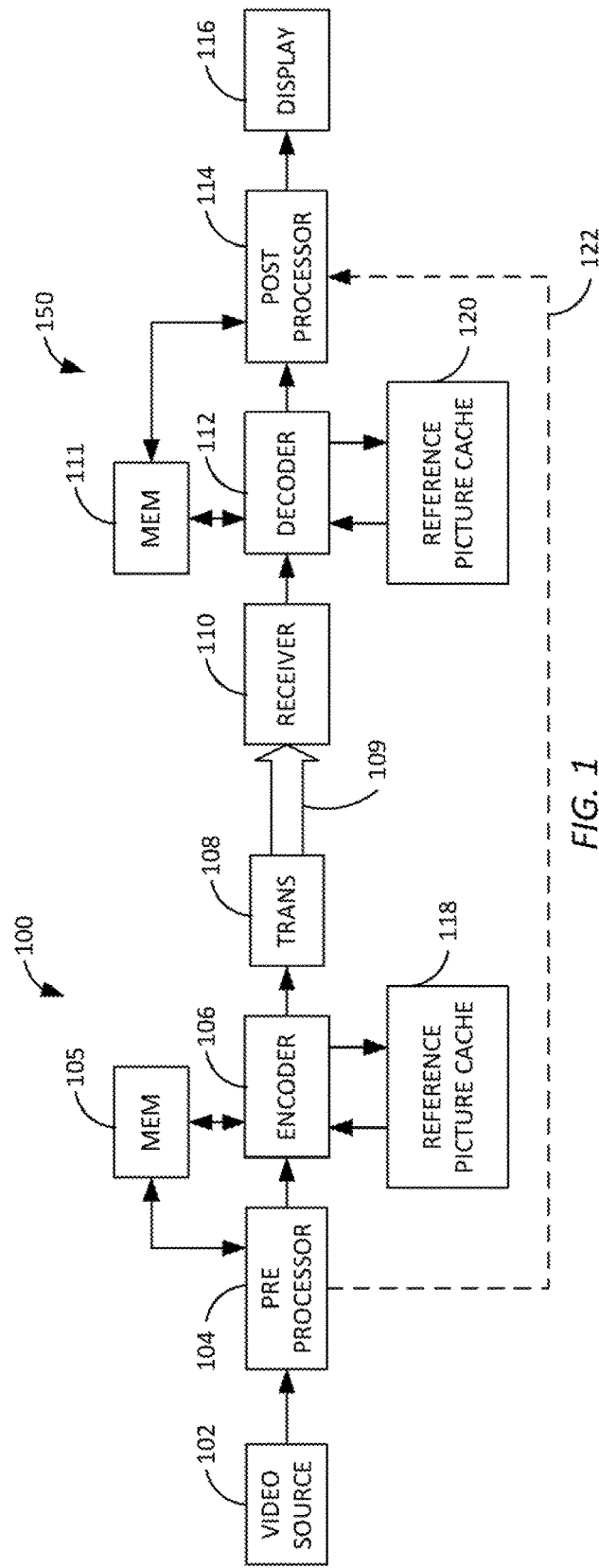
FIG. 1 depicts an embodiment of a video coding system comprising an encoding system and a decoding system.

FIG. 1 depicts an embodiment of a video coding system comprising an encoder system 100 and a decoder system 150. The encoder 100 system can comprise processors, (including digital signal processors (DSPs), or specialized video processors) memory, circuits, and/or other hardware and software elements configured to encode, transcode, and/or compress input video a coded bit stream 109. The encoder system 100 can, for example, be configured to generate the coded bit stream 109 according to a video coding format and/or compression scheme, such as HEVC (High Efficiency Video Coding), H.264/MPEG-4 AVC (Advanced Video Coding), or MPEG-2.

The example encoder system 100 receives HDR and/or WCG video data from a video source 102. The system 100 includes a preprocessor 104 that adaptively processes the HDR and/or WCG data so that it may be encoded using an encoder 106 and a memory 105. The encoder 106 may be a Main 10 HEVC encoder that encodes video data using reference pictures in a reference picture cache 118. The encoded video data may be stored in the memory 105 which may also store data used by the decoder 106 and/or preprocessor 104, for example look-up tables that implement transfer functions and/or tone maps. Although the preprocessor 104 and encoder 106 are shown as using a shared memory 105, it is contemplated that they may use separate memories. The encoded data may be transmitted using the transmitter 108 as a bit stream 109 to a receiver 110 of the decoder system 150. The transmitter and receiver may use any transmission method including wired, wireless or optical connections. In one embodiment, the transmitter may format the encoded video data as Internet protocol (IP) packets and transmit the IP packets to the receiver 110 over a network. The network may be a digital cable television connection using Quadrature Amplitude Modulation (QAM), or other digital transmission mechanism. The network may be a wired cable network, an optical fiber network, or a wireless network. The network may be a private network or a global information network (e.g. the Internet®). In addition to transmitting the encoded video data, the transmitter 100 transmits metadata 122 describing the processing performed by the preprocessor 104. Although the metadata 122 is shown as a separate signal, it may be included in the bit stream 109, for example, as supplemental enhancement information (SEI) or video usability information (VUI) data in the bit stream or in the headers of image essences, image sequences, Groups of Picture (GOP), Pictures, Slices, or other sub-picture elements. The SEI or VUI may identify a rectangular processing windows defined by x and y coordinates of the input image data and particular metadata defining the processing performed by the encoder on the identified processing window. The metadata uses part of the bandwidth of the transmitted bit-stream. It is desirable, therefore, to reduce the amount of metadata that is sent from the encoder system 100 to the decoder system 150.

The decoder system 150 can comprise processors, memory, circuits, and/or other hardware and software elements configured to receive the bit stream 109 at receiver 110 and to decode, transcode, and/or decompress the coded bit stream 109 into decoded HDR and/or WCG video for presentation on the display 116. The decoder system 150 can be configured to decode the coded bit stream 109 using a decoder 112 according to a video coding format and/or compression scheme, such as H.265 HEVC, H.264/MPEG-4 AVC, or MPEG-2. By way of a non-limiting example, in some embodiments the decoder 112 can be a Main 10 HEVC decoder that uses reference images stored in the reference picture cache 120. The decoder 112 is coupled to a memory 111 that holds the coded bit stream and may also hold data used by the decoder 112 and/or post processor 114 such as look-up tables implementing inverse transfer functions and/or tone maps. Although the decoder 112 and post processor 114 are shown as using a shared memory 111, it is contemplated that they may use separate memories. After the video data is decoded, it is processed by a post-processor 114 that, responsive to the metadata received from the encoder, inverts the processing performed by the preprocessor 104 to regenerate the HDR and/or WCG video data. The decoded HDR and/or WCG video data can be output to a display device for playback, such as playback on a television, monitor, or other display 116.

In some embodiments, the encoder system 100 and/or decoder system 150 can be a dedicated hardware devices. In other embodiments the encoder system 100 and/or decoder system 150 can be, or use, software programs running on other hardware such as servers, computers, or video processing devices. By way of a non-limiting example, an encoder system 100 can be a video encoder operated by a video service provider, while the decoder system 150 can be part of a set top box, such as a cable box, connected to a consumer television display.

The input video data provided by the video source 102 can comprise a sequence of image frames, a group of pictures (GOP) or an image essence. In some embodiments, colors in the pictures can be described digitally using one or more values according to a color space or color model. By way of a non-limiting example, colors in a picture can be indicated using an RGB color model in which the colors are described through a combination of values in a red channel, a green channel, and a blue channel.

The input video data can be HDR video having one or more frame sequences with luminance and/or chrominance values described in a high dynamic range (HDR) and/or on a wide color gamut (WCG). By way of a non-limiting example, a video with a high dynamic range can have luminance values indicated on a scale with a wider range of possible values than a non-HDR video, and a video using a wide color gamut can have its colors expressed on a color model with a wider range of possible values in at least some channels than a non-WCG video. As such, an HDR input video can have a broader range of luminance and/or chrominance values than standard or non-HDR videos.

In some embodiments, the HDR input video data can have its colors indicated with RGB values in a high bit depth format, relative to non-HDR formats that express color values using lower bit depths such as 8 or 10 bits per color channel. By way of a non-limiting example, the HDR input video data can be in an EXR file format with RGB color values expressed in a linear light RGB domain using a 16 bit floating point value (having 10 significant bits, 5 exponent bits and one sign bit) for each color channel.

As shown in FIG. 2A, the encoder system 200 can apply, to the linear HDR RGB data, a first (intermediate) color conversion operation (color volume transform) 202, a first transfer function 204, a second (final) color conversion operation 206 a second (coding) transfer function 208, and an optional perceptual normalization operation 210 before quantizing the processed data to 10-bit values, down-sampling the chrominance information and encoding the resulting data using an existing encoder 216 such as a Main 10 HEVC encoder. The blocks 202, 204, 206, 208 and 210 implement a compression and perceptual mapping operation that converts the linear HDR RGB values from video source 202 onto values on a non-linear curve, based on one or more temporally and/or spatially localized characteristics of the video's content.

By way of nonlimiting examples, the perceptual mapping operation can be tailored to the content of the video data set, which may include all or a portion of the HDR/WCG video data, based on intended maximum or minimum sample values, minimum brightness, average brightness, peak brightness, maximum contrast ratio, a cumulative distribution function, quantization step size and/or any other factor in the data set. In some embodiments, such characteristics can be predetermined and specified for the data set. Alternatively, the characteristics can be found through a histogram or statistical analysis of color components or luminance components of the video at various stages of processing. In one example, the digital image data may be segmented into processing windows prior to applying the transfer functions or tone mapping operations. One or more component (e.g. Y'CbCr) of each processing window may be analyzed to determine, for example minimum sample value, maximum sample value, average sample value, value, and maximum contrast (e.g. the ratio of the maximum sample value to the minimum sample value). These values may be calculated for a single component or for combinations of two or more components. These values may be analyzed to determine the perceptual mapping (e.g. coding transfer function and perceptual normalization) to apply to the processing window.

The example perceptual mapping is configured to redistribute linear color information on a non-linear curve that is tailored to the content of the input video data on a global or local temporal or spatial range in order to allow the HDR video data to be more efficiently encoded using the encoder 216 so that it may be decoded and reconstructed as HDR video data in the decoding system 220 shown in FIG. 2B. As described below converting the linear color values to other color spaces and applying non-linear curves based on the content of the input video can provide HDR and/or WCG detail in the reconstructed image while reducing the risk of distortion and/or noise being introduced through uniform quantization operations. In some embodiments, a greater number of bits and/or quantization levels can be allocated to ranges of intensities and hues that are present in a portion of a video frame and/or that are most likely to be perceived by a human viewer, while fewer bits and/or quantization levels can be allocated to intensities and hues that are not present in the color channels and/or that are less likely to be perceived by viewers.

By way of a non-limiting example, when the input video data represents a scene in that takes place at night, its pictures can primarily include dark colors that are substantially bunched together in the RGB domain. In such a scene, lighter colors in the RGB domain can be absent or rare. In this situation the combined perceptual mapping can be adapted such that the chrominance and luminance values are redistributed on one or more non-linear curves that include the range of chrominance and luminance values actually present within the scene, while omitting or deemphasizing values that are not present within the scene. As such, formerly bunched-together dark chrominance and luminance values can be spread out substantially evenly on a curve of non-linear values (allocated a larger number of uniform quantization steps) while less common brighter values can be compressed together (allocated a smaller number of quantization steps) or even omitted if they are absent in the scene. As the dark values can be spread out on the curve, fine differences between them can be distinguished even when the values on the non-linear curve are uniformly quantized into discrete values or code words.

As described above, the perceptual mapping operation can be adaptive, such that it can change to apply different non-linear transfer functions depending on the content of the input video for a sequence of pictures, a single picture or a sub-picture window. Sub-picture processing allows different sub-areas of the same picture, such as processing windows, slices, macroblocks in AVC, or coding tree units (CTUs) in HEVC to be processed differently, based on their content. In other embodiments or situations, the perceptual mapping operations can be changed on a picture level for different pictures. In still other embodiments or situations, the perceptual mapping operation can be changed on a suprapicture level for different sequences of pictures, such as different Groups of Pictures (GOPs) or image essences. A perceptual mapping operation can be applied in any desired color space, such as the RGB, Y'CbCr, X'Y'Z' or I'PT color spaces. The content of video data representing a particular sequence of pictures, single picture or sub-picture element may be determined by generating a histogram of pixel values represented by the video data. For example, an image having both relatively dark and relatively bright areas may be segmented, for example, using a quad-tree algorithm, so that data from the dark areas are in one set of processing windows and data from the bright areas are in another set of windows. The perceptual mapping applied to the windows in the dark areas may be different than that applied in the bright areas, allowing detail in both areas to be maintained and displayed in the reproduced HDR image.

In one implementation, the perceptual normalization block 210 and/or the coding transfer function block 208 can apply a perceptual mapping transfer function to the Y'CbCr values provided by the color conversion block 206 to generate perceptually mapped Y'CbCr values. In some embodiments the perceptual mapping operation can use a 3D lookup table (LUT) or multiple 1D LUTs that map Y'CbCr values to associated perceptually mapped Y'CbCr values. In other embodiments, the perceptual mapping operation can use one or more formulas to convert each color component. By way of a non-limiting example, the perceptual mapping operation can convert values using formulas such as: Y'_PM=f(Y', Cb, Cr) Cb_PM=g(Y', Cb, Cr) Cr_PM=h(Y', Cb, Cr) In this example, the functions can each take the three Y'CbCr values as inputs and output a perceptually mapped Y'CbCr values.

When one or more LUTs or equations are used to implement the coding transfer function it may be desirable to send metadata defining a corresponding inverse coding transfer function from the encoding system 100 to the decoding system 150. Because different coding functions may be used for different groups of pictures, pictures or sub-picture processing windows, the encoding system 100 may send metadata describing each of the LUTs and/or equations to the decoding system 150. The materials below describe an efficient data structure (i.e. a metadata structure) and method for storing and sending this metadata so that the metadata consumes a relatively small amount of the total signal bandwidth between the encoding system 100 and decoding system 150.

As shown in FIG. 2A, the example encoder 200 performs the first color conversion operation 202 on the HDR/WCG linear RGB data set. This operation transforms the linear RGB values into an intermediate linear color space, for example, LMS, XYZ or YCbCr. This transformation reduces the redundancy in the RGB data and puts the data in a format that is more conducive to compression. It is contemplated, however, that, depending on the format of the input data, block 202 may not perform any color conversion or may perform different color conversion operations on different portions of a video sequence including different portions of a single frame. The color conversion operation 202 may also produce metadata indicating the conversion operation that was performed and on which portions of the sequence, frame or image it was performed. Instead of merely identifying the transformation, the metadata may include the matrix coefficients that represent the inverse of the color transformation operation applied by block 202. Instead of the metadata including the inverse coefficients, it is contemplated that it may include the coefficients that were used in the color volume conversion operation 202 and that the inverse coefficients may be generated in the decoder 220. The color conversion operation 202 may produce data in a color space that is easier to process by the first transfer function 204.

The transfer function 204 may be a gamma function that compresses bright and/or dark pixel values into a smaller range of values. Alternatively, it may be a perceptual transfer function, such as a perceptual quantization (PQ) transfer function. As another alternative, it may be an identity function that does not result in any transformation of the color converted video data. This function can be applied only to the luminance channel or to each channel and different functions may be applied to different portions of a video sequence and/or different frames or portions of frames in the sequence. For example, a gamma or PQ transfer function applied to the luminance channel in a relatively dark area of an image may result in a related operation (e.g. a cross-channel scaling operation) being applied to the chrominance channel data in that image area. Block 204 also generates metadata describing the inverse of the transform that was applied and the portion of the image data to which it was applied. This metadata may include parameters that describe the inverse transfer function as a linear quadratic, cubic or higher order equation. The complete transfer function may be generated from these values, for example, using linear, quadratic, cubic or higher-order spline curve fitting operation, to specify coefficients of a linear, quadratic or cubic equation that model each segment of the inverse transfer function. Using these methods, the transfer function may be specified as a sequence of pivot points and coefficients of a linear, quadratic, cubic or higher-order equation for a function that joins each successive pair of pivot points.

The color converted and transformed data from block 204 is then subject to a final color conversion operation in block 206. This color conversion operation may, for example, convert the video data to a color space such as I'PT or Y'CbCr that is more suitable for perceptual compression, especially for WCG image data. Block 206 may convert a sequence of images, single images, or portions of images into one or more color spaces that are easier to process for perceptual normalization and quantization. As with block 202, the color conversion performed by block 206 may be the identity function, resulting in no conversion. Alternatively, different color transformation operations may be performed on different portions of the video data. Furthermore, block 206 can generate metadata describing the color conversion that was performed and the portions of video data (supra-frames, frames or sub frames) to which it was applied. This metadata may simply identify the portion of the data and the conversion that was applied. Alternatively, instead of identifying the conversion, the metadata may include the coefficients of the 3×3 conversion matrix. As described above, the metadata may describe the color conversion that was performed by block 206 or its inverse.

After block 206, the twice color converted video data is subject to a second transfer function 208. Function 208 may be a coding transfer function that prepares the video data for quantization and coding by emphasizing video information that will be perceived as important by the human visual system and deemphasizing video information that will be perceived as unimportant. Transfer function 208 may be a function that conforms the data to human perception, for example, a Stevens' power law or Weber law transfer function with a gamma component that can be selected based on image content, intended maximum and minimum sample values, maximum brightness or luminance contrast and/or quantization step size in the portion of the video data to be processed. Block 208 may include multiple transfer functions, one of which is selected for a particular video data set. Transfer function 208 may adjust the image to account for contrast sensitivity of the luminance pixels and remap the corresponding chrominance samples based on the transformation applied to the luminance samples. This function may be applied to the video data set which may include a sequence of frames, a single frame or a portion of a frame, such as a processing window. As with the other blocks in the preprocessing stage, the coding transfer function block 208 can generate metadata describing the transfer function that was applied, or its inverse, and the frames or portions of frames to which it was applied. This metadata may describe the transfer function parametrically or by a sequence of values. Parameters for the transfer function to be applied may be determined by analyzing the video data provided to the transfer function.

In one implementation, multiple inverse transfer functions may be defined corresponding to multiple transfer functions applied to various data sets. Information describing the multiple inverse transfer functions may be signaled in the image data at a relatively high level (e.g. the image essence, sequence or GOP level) and a particular one of the multiple inverse transfer functions may be selected to be applied to a particular data set (e.g. image, slice, or sub-image processing window).

The video data may be divided into processing windows, for example, by applying a quad tree decomposition to the image data so that the data in each leaf has a characteristic value (e.g. maximum and minimum sample values, maximum brightness or luminance contrast and/or quantization step size). Alternatively, the quad-tree algorithm may divide the image such that a predetermined percentage (e.g. 80-95%) of the image data in each leaf of the quad tree has data values within a predetermined range or ranges. In another alternative, the processing windows can be specified as regions to which tone mappings are applied to achieve a desired subjective target such as determined by a colorist. The region shape can be rectangular, circular, etc. where parameters of the shape, location, size, etc. can be specified. When identifying a processing window, it may be desirable to determine the maximum, average, and minimum values of each video component video data in the processing window and to supply these values to the transfer function block 208. For example, the system may determine the minimum, average and maximum values by performing a histogram on the processing window that divides the image pixels into bins and selecting a set of contiguous bins that span some percentage (e.g. 80-95%) of the pixels in the processing window. The minimum data value may be the minimum value defined by the bin containing the smallest data values, the maximum data value may be the maximum value defined by the bin containing the largest data values, and the average value may be the mean or median of all values in all of the selected bins. Block 208 then adapts the coding transfer function and/or perceptual normalizer 210 (e.g. selects a particular one of the predefined transfer functions) to increase the number of quantization steps assigned between the minimum and maximum values while decreasing the number of quantization steps assigned to values less than the minimum and/or greater than the maximum. The adaptation is noted in the metadata which also includes data identifying the processing window. This metadata is sent to the decoder with the bit stream so that inverse perceptual normalization and inverse coding transfer functions may be applied to the data decoded from the bit stream. The metadata may include data from which the multiple inverse transfer functions may be retrieved as well as parameters describing the selected transfer function so that the selected inverse transfer function may be reconstituted as a look-up table (LUT).

While the identification of processing windows is described as being performed by the coding transfer function block 208, it is contemplated that it may be performed by other elements of the decoder. For example it may be performed by the video source 102 (shown in FIG. 1) or by the intermediate color conversion block 202. In addition to dividing individual frames into processing windows, the same algorithm may be used to group frames in the digital video data by their common characteristics, and/or to identify characteristics of individual frames. It may be advantageous to identify portions of the digital video data having common characteristics early in the encoding process so that both of the color conversion processes and the compression transfer function process may be tailored to the same portions.

After the coding transfer function 208, the video data set may be subject to perceptual normalization at block 210. This step adjusts the gain (scaling) and offset of the video data to make the perceptual compression of the video data more uniform across the group of frames and/or frame. Perceptual normalization may also perform cross-channel processing to compensate the chrominance samples for processing performed on the corresponding luminance samples. The gain and offset values or their inverses, as well as an identification of the portions of the image data to which they were applied, is provided as metadata. Perceptual normalization may not be used when the transfer functions 204 and 208 produce uniformly perceptually transformed data or when it is not important for the video data to be uniformly perceptually transformed.

In this example, which uses a Main 10 HEVC encoder, the normalized perceptually compressed data provided by the transfer function 208 and/or optional perceptual normalization process 210 are quantized to 10-bit values in the quantizer 212. If the output samples of the transfer function 208 and/or perceptual normalizer 210 are floating-point values, quantizer 212 may convert the pixel samples from floating-point to 10 bit fixed point values. If output samples are N-bit fixed-point values (N>10) the quantizer may select the 10 most significant bits (MSBs) of the N-bit samples or round these values based on the $11^{th}$ bit. Because of the preprocessing performed by blocks 202, 204, 206, 208 and 210, more perceptually significant image data receives a greater number of quantization levels than less perceptually significant data. It is contemplated that the quantizer 212 may employ scalar or vector quantization for the color components.

Next, block 214 down-samples the chrominance information to convert the 4:4:4 pixels into 4:2:0 pixels. The reduction of resolution of the chrominance samples is not noticeable to the human visual system which perceives colors at lower spatial resolution than luminance. Metadata defining the processing performed to down-sample the chrominance information is added to the metadata from the down-sampling block 214 of the encoder. This metadata, for example, may describe the kernel of a two-dimensional spatial filter that was used to generate the down-sampled data or an inverse filter that generates spatially up-sampled data from the down-sampled data. The metadata may also specify any phase shift offsets in the subsampling operations. The encoder 216 then encodes the pre-processed, quantized and down-sampled data to produce an output bit stream. In one implementation, the metadata is encoded with the bit stream as supplemental enhancement information (SEI) or video usability information (VUI) data. Although block 214 is shown as converting 4:4:4 pixels to 4:2:0 pixels, it is contemplated that other conversions could be performed, for example converting the 4:4:4 pixels to 4:2:2 or 4:1:1 pixel formats. If any of these alternate down-sampled formats is generated by block 214, corresponding up-sampling would be performed by the corresponding block in the decoding system.

The decoding system 220 shown in FIG. 2B receives the bit stream at decoder 222. The example Main 10 HEVC decoder 222, extracts the metadata, and reverses the encoding operation performed by the encoder 216 to produce 10-bit video data in a 4:2:0 pixel format. The metadata produced by the chrominance down-sampler 214 is applied to an up-sampler 224 that reconstructs 4:4:4 pixel format samples from the 4:2:0 samples, for example by applying the 4:2:0 samples to a spatial interpolation filter. These samples are provided to an inverse quantizer 226 that convert the 4:4:4 pixel samples to floating point values or may add zero-valued more significant bits to fixed-point samples. The operations performed by the inverse quantizer 226 tend to reverse the quantization operations performed by the quantizer 212.

Block 228, based on the metadata received from the perceptual normalization block 210, performs complementary gain and offset operations to reverse the gain and offset adjustments performed by the perceptual normalization filter 210. Similarly, block 230 applies a transfer function that is the inverse of the coding transfer function 208. This may be an inverse Stevens' law or an inverse Weber law transfer function generated from parameters in the metadata or it may be a transfer function regenerated from values in the metadata that represent either samples of the applied filter characteristic or line segments of a linearized or higher order characteristic. As described above, multiple inverse transfer functions may have been specified at a sequence or GOP level and one of these transfer functions may be signaled for the video data set (e.g. frame or sub-frame), depending on the content of the video data set.

Similarly, blocks 232, 234 and 236 of decoder 220 respectively invert the final color conversion operation performed by block 206, the first transfer function performed by block 204 and the intermediate color conversion operation performed by block 202 of the encoder 200. These operations are performed only on the data sets representing the regions of the frame or frames associated with the color conversion operations and transfer functions as indicated by the metadata. The output data provided by the inverse color conversion block 236 is a reconstructed linear HDR and/or WCG RGB signal. Perceptually important data such as detail and texture in dark portions of the images and color values in both the dark and bright portions of the images are preserved in the reconstructed data while less perceptually important data may be lost. Although the systems shown in FIGS. 2A and 2B as well as the systems shown in FIGS. 3A and 3B below are shown as receiving and reconstructing linear HDR RGB data, it is contemplated that they may receive and reconstruct other HDR and/or WCG data.

Figure 3A:
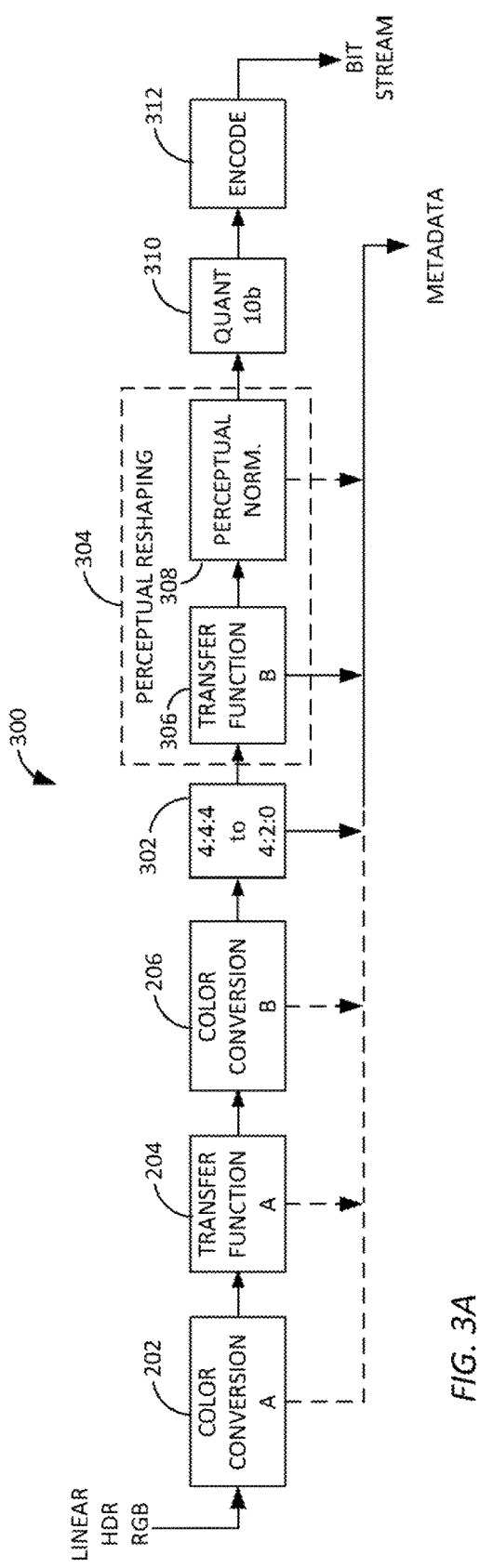
FIGS. 3A and 3B depict a second example of a process for encoding and decoding an input HDR and/or WCG video sequence using a non-HDR, non-WCG video encoder and decoder where the coding transfer function used by the encoder is combined with a perceptual normalization operation and the inverse coding transfer function used by the decoder is combined with an inverse perceptual normalization process.
Figure 3B:
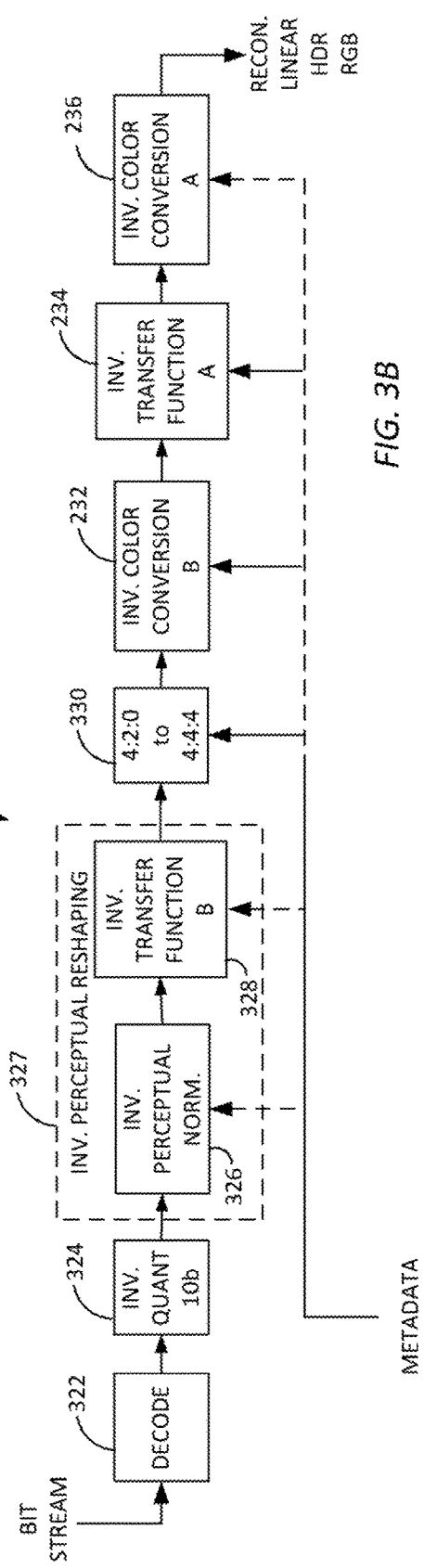

FIGS. 3A and 3B describe a variant of the encoding and decoding systems shown in FIGS. 2A and 2B. Many of the blocks shown in FIGS. 3A and 3B are the same as the blocks in FIGS. 2A and 2B that have the same numbers. For the sake of brevity, the operation of these blocks is not separately described herein. One difference between FIGS. 2A and 2B on the one hand and FIGS. 3A and 3B on the other hand is the perceptual reshaping block 304 and the corresponding inverse perceptual reshaping block 327 shown in FIG. 3B. Block 304 combines the coding transfer function 306 with the perceptual normalization operation 308 and, similarly, block 327 combines the inverse perceptual normalization operation 326 and the inverse coding transfer function block 328.

Another difference between the systems 200 and 220 shown in FIGS. 2A and 2B relative to the respective systems 300 and 320 shown in FIGS. 3A and 3B is the locations of the chrominance down-sampling process 302 and the chrominance up-sampling process 330 in the processing stream. In FIG. 3A the down-sampling process 302 operates on the data provided by the final color conversion process 206. Similarly, in FIG. 3B, the up-sampled output values provided by the up-sampling process 330 are applied to the inverse color conversion process 232, which is the inverse of the process 206. The relocation of the down-sampling and up-sampling processes results in the perceptual reshaping processing being performed on pixels having down-sampled chrominance values. This modification may result in less processing as fewer chrominance samples are processed by blocks 306, 308, 310 shown in FIG. 3A and blocks 324, 326 and 328 shown in FIG. 3B than are processed by the corresponding blocks 208, 210 and 212 shown in FIG. 2A and blocks 226, 228 and 230 shown in FIG. 2B. As described above, further processing reduction may be achieved by including the offset and gain adjustments performed by the perceptual normalization process 308 with the coding transfer function 306 and including the inverse offset and gain adjustments performed by the inverse perceptual normalization process 326 with the inverse coding transfer function 328. Thus, the encoder and decoder system shown in FIGS. 3A and 3B may be more efficient than the encoder and decoder shown in FIGS. 2A and 2B.

In one example, the output of inverse rescaling can be computed as f(x)—or based on f(x)—given the input color component x (e.g. Y, Cb, Cr). For a piecewise function with N segments, the N functions $f_i(x)$, $0<=i<N$, can be defined so that $$f(x)=f_i(x), \text{ for } x_i \le x < x_{i+1} \tag{1}$$

In one implementation, the N+1 segment boundary points $x_i$, referred to herein as pivots, as well as parameters for the piecewise functions can be signaled. If $f_i(x)$ is a polynomial having an order of $M_i$ the metadata describing the polynomial includes $M_i+1$ parameters. Based on the values signaled, a LUT corresponding to the inverse reshaping transfer function can be reconstructed at the decoding system 150. A different LUT can be used for each color component, and an indication of which LUT is to be used for the reshaping for a given color component in a given image or sub-image processing window can also be signaled in the metadata. To reduce the amount of metadata used to signal the multiple (L) inverse reshaping transfer functions, the corresponding piecewise functions for L LUTs may be signaled in a self-referential metadata structure containing the metadata sent from the encoding system 100 to the decoding system 150.

Figure 4:
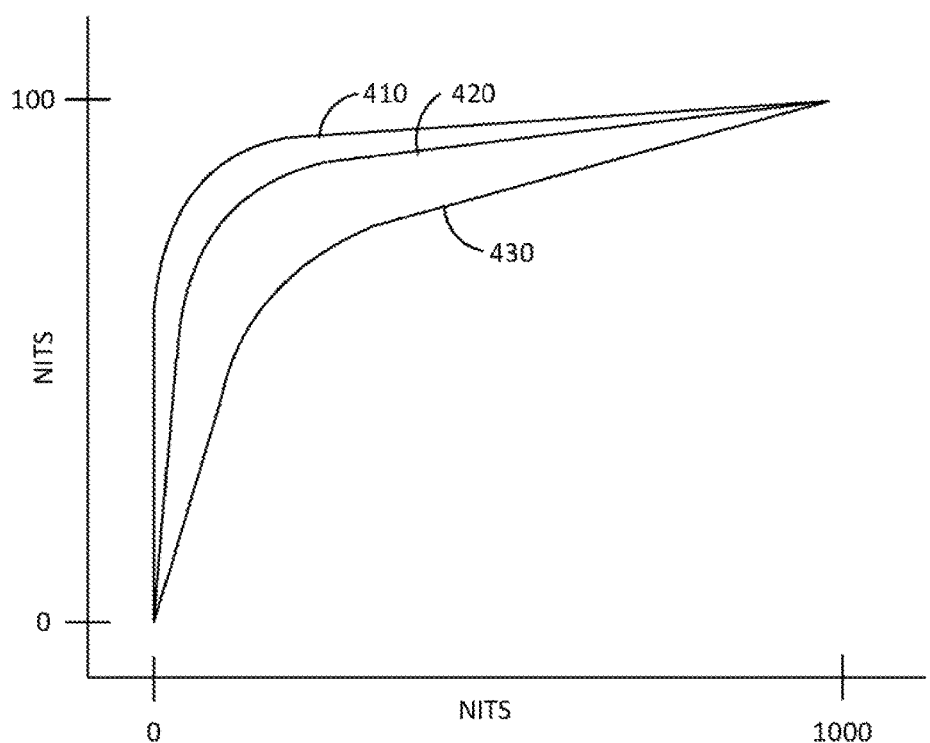
FIG. 4 is a graph showing example coding transfer functions that may be applied by the encoders shown in FIGS. 2A and 3A.
Figure 5:
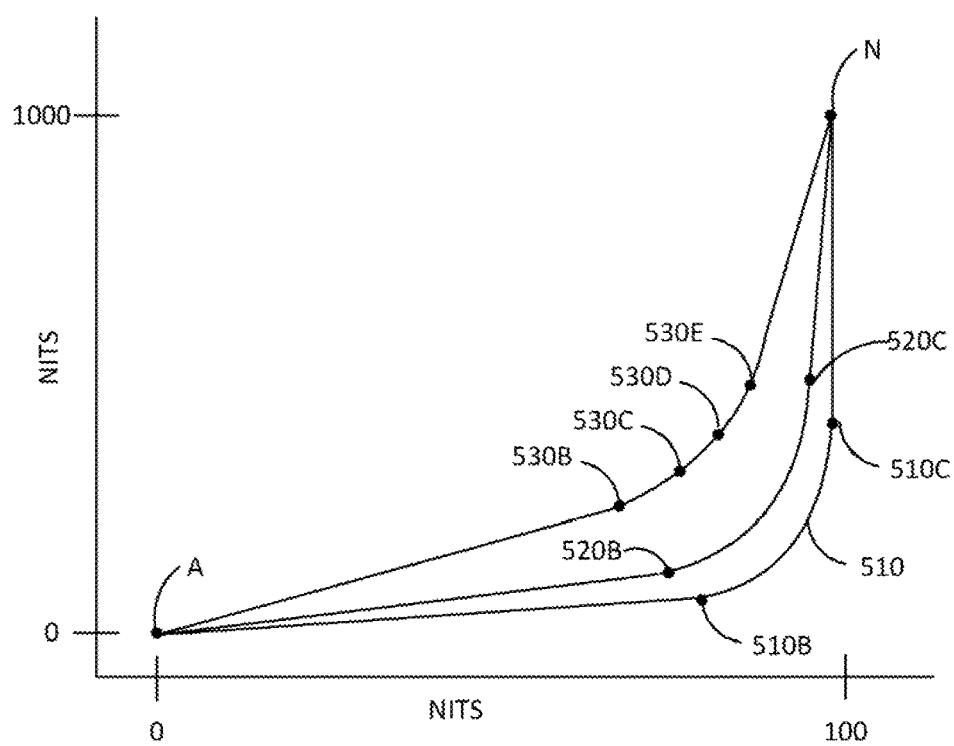
FIG. 5 is a graph showing example inverse coding transfer functions that may be applied by the decoders shown in FIGS. 2B and 3B.

FIGS. 4 and 5 show example reshaping transfer functions and inverse transfer functions, respectively. The functions 410, 420 and 430 shown in FIG. 4 are gamma coding transfer functions having respectively different gamma values and the functions 510, 520 and 530 shown in FIG. 5 are corresponding inverse gamma transfer functions. The inverse transfer function 510 is divided into three segments, defined by four pivot points. The initial pivot point, A, and final pivot point, N, are common for all three transfer functions. Function 510 has two pivot points, 510B and 510C in addition to pivot points A and N. It is noted that the segment between pivot points A and 510B is approximately linear (e.g. has a quadratic coefficient that is less than 5% of its linear coefficient). The segment between points 510B and 510C exhibits a curve and, thus, may have significant quadratic and cubic coefficients. The segment between the pivot point 510C and pivot point N is also approximately linear.

The transfer function defined by curve 520 is similar to that defined by 510 in that the segment between points A and 520B is approximately linear, the segment between points 520B and 520C is curved and the segment between points 520C and N is approximately linear. Curve 530 shows a transfer function having a larger number of pivot points, in this case, six: A, 530B, 530C, 530D, 530E, and N. The segments between points A and 530B on the one hand and points 530E an N on the other hand are both approximately linear. Transfer function 530 has three curved segments defined by the four pivot points 530B, 530C, 530D and 530E.

The materials that follow present example syntaxes that define how the transfer functions are represented in the metadata sent from the encoding system 100 to the decoding system 150 (shown in FIG. 1). Also described below are examples of metadata structures formed for the example inverse transfer functions shown in FIG. 5.

In an example syntax in TABLEs 1 and 2 it is proposed that a number of reshape transfer functions, NumLutReshape, may be signaled in the metadata, and an index value, lut_reshape_index[c], may be used to select the inverse reshaping function for the color component c of a particular video data set. Thus, the metadata defining the NumLutReshape LUTs (shown in TABLE 1) may be included in metadata at a relatively high level (e.g. image essence, Sequence or GOP) while metadata specifying the reshapeing_id of a specific LUT to use for a color component of a video data set (shown in TABLE 2) may be in the metadata at a lower level (e.g. Picture, Slice or Processing Window). The materials that follow concern metadata used in the inverse reshaping operation in the decoder 150. Thus, for the sake of simplicity, the inverse reshaping operations described here may be referred to as simply reshaping operations.

TABLE 1

| | Descriptor | No. |
|---|---|---|
| reshaping_parameters( ) { | | |
|   num_lut_reshape_greater1_flag | u(1) | 1 |
|   if ( num_lut_reshape_greater1_flag ) | | 2 |
|     num_lut_reshape_minus2 | u(4) | 3 |
|   for( k = 0; k < NumLutReshape; k++ ) { | | 4 |
|     if ( num_lut_reshape_greater1_flag ) { | | 5 |
|       lut_reshape_id | u(4) | 6 |
|     } | | 7 |
|     signal_reshape_num_pivots_minus2 [ k ] | u(3) | 8 |
|     for( i = 0; i < | | 9 |
|     signal_reshape_num_pivots_minus2 [ k ] + 2 ; i++ ) { | | |
|       signal_reshape_coded_pivot_value[ k ][ i ] | u(10) | 10 |
|     } | | 11 |
|     for( i = 0; i < signal_reshape_num_pivots_minus2 [ k ] + 1; i++ ) { | | 12 |
|       poly_order [ k ][ i ] | u(2) | 13 |
|       for( j = 0; j <= poly_order [ k ][ i ]; j++ ) { | | 14 |
|         poly_coef[ k ][ i ] [ j ] | se(v) | 15 |
|       } | | 16 |
|     } | | 17 |
|   } | | 18 |
| } | | 19 |

TABLE 2

| | Descriptor | No. |
|---|---|---|
| reshaping_id( ) { | | |
|   if ( num_lut_reshape_greater1_flag ) { | | 1 |
|     for( c = 0; c < 3; c++ ) { | | 2 |
|       lut_reshape_index[c] | u(4) | 3 |
|     } | | 4 |
|   } | | 5 |
| } | | 6 |

The descriptors used in TABLES 1 and 2 describe characteristics of the metadata values. A u(n) descriptor refers to an n-bit unsigned integer. A u(1) descriptor may also refer to a one-bit Boolean value. A se(v) descriptor refers to a variable-length signed integer value. In one implementation, this descriptor indicates an Exp-Golomb-coded value Similarly, a ue(v) descriptor refers to a variable-length unsigned integer value which may also be an Exp-Golomb coded value.

The data syntax in TABLEs 1 and 2 describes a self-referential metadata structure that includes entries which determines how data items are allocated in order to reduce the amount of metadata used to signal multiple reshaping transfer function LUTs to a video decoder, relative to the amount of data that would be used if the LUTs were included in the metadata. The following items are used in the syntax of the metadata used to signal the inverse transfer functions for an image essence, video sequence or picture.

The terms used in TABLES 1 and 2 are defined as follows.

num_lut_reshape_greater1_flag equal to 0 specifies that the metadata includes a single reshaping LUT function (i.e. NumLutReshape=1). When num_lut_reshape_greater1_flag is equal to 1, the metadata includes multiple reshaping LUT functions.

num_lut_reshape_minus2+2 specifies the number of reshaping LUT functions (NumLutReshape) when num_lut_reshape_greater1_flag=1. The value of num_lut_reshape_minus2 ranges between 0 and 14. As described above, multiple reshape transfer functions may be included in the metadata for an image essence, a sequence, a group of pictures or a picture. This value is stored as the number of reshape transfer functions "minus two" to further reduce the storage requirements. As described above, if num_lut_reshape_greater_1_flag=0, the metadata includes a single transfer function. When num_lut_reshape_greater_1_flag=1 and num_lut_reshape_minus_2=0, the metadata includes two reshape transfer functions. Because the maximum value of num_lut_reshape_minus_2 is 14, a maximum number of 16 reshaping transfer functions are allowed in the metadata by this example data syntax. Specifying the number of reshaping transfer functions allows the amount of metadata to be adjusted to match the requirements of the particular image or image sequence, so that the metadata includes only the number of transfer functions that are to be used by the decoder.

lut_reshape_id specifies the LUT id number for one reshaping transfer function in the metadata. The value of lut_reshape_id may range from 0 to 15. If lut_reshape_id is not present, it is inferred to be equal to 0.

signal_reshape_num_pivots_minus2[k] plus 2 specifies the number of pivot values in the piecewise segmented function for the reshaping transfer function having the lut_reshape_id=k. The value of signal_reshape_num_pivots_minus2[k] ranges from 0 to 7, allowing for as many as nine pivot points. The metadata includes at least one transfer function and, as described below with reference to FIGS. 4 and 5, a transfer function has at least two pivot points (the endpoints) so there is no need for the number of pivot points to be 0 or 1. Specifying the number of pivot points reduces the amount of metadata relative to a system in which a fixed number of pivot points is assumed.

signal_reshape_coded_pivot_value[k][i] specifies the pivot value for pivot point i in transfer function k. Each pair of pivot values forms a piecewise segment of the transfer function. The value of signal_reshape_coded_pivot_value [k][i] ranges from 0 to 1023. These pivot values may be scaled or mapped to real values to correspond to appropriate input values.

poly_order[k][i] specifies order of the polynomial of the piecewise reshaping function for transfer function k and segment i. The value of poly_order[k][i] ranges from 0 to 3. This value specifies the number of coefficients used in the function $f_i(x)$ for the transfer function k, as shown in equation (1) above.

poly_coef[k][i][j] specifies the polynomial coefficient j for the transfer function segment between pivot points i and i+1 in the piecewise segmented function k. The value of poly_coef[k][i][j] ranges from −1024 to +1023, inclusive. These coefficients may be generated, for example, by fitting the segments of the transfer functions to linear, quadratic and cubic equations and selecting the fitted equation having the smallest error as the equation that defines the segment. The coefficients of the selected equation are the polynomial coefficients of the segment in the metadata structure.

The LUT reshaping function per component c can be computed using the piecewise polynomial functions as follows, where table k=lut_reshape_index[c] is used, 0<=k<NumLutReshape. The input value is x and the output value is computed as f(x) for the $i^{th}$ segment. These output values may be scaled or normalized to correspond to appropriate output values.

$$f(x) = \sum_{j=0}^{M_i} a_{ij}(x-x_i)^j, \qquad (2)$$

for $x_i \le x < x_{i+1}$

Where: x_i=signal_reshape_coded_pivot_value[k][i];
a_ij=poly_coef[k][i][j];
M_i=poly_order[k][i];
0≤i≤signal_reshape_num_pivots_minus2[k]

FIG. 6A is a data diagram illustrating the metadata structure formed by applying the syntax shown in TABLE 1 to the transfer functions 510 and 520 shown in FIG. 5. For the sake of clarity, the names of the data fields have been simplified in FIG. 6A relative to the names shown in TABLE 1. At line 1 of TABLE 1 and block 602 of FIG. 6, the syntax sets num_lut_reshape_greater1_flag to 1, indicating that the metadata structure includes metadata for more than one reshaping transfer function. Next, line 3 of TABLE 1 (block 604) sets num_lut_reshape_minus2 to 1, indicating that the metadata structure includes three LUTs. The lut_reshape_id of the first LUT is set to 0 according to the syntax at line 6 of TABLE 1 (block 606). At line 8 of the syntax (block 608 of FIG. 6), signal_reshape_num_pivots_minus2, for the first LUT, is set to 2, indicating that the function that generates the first LUT (LUT 0) has four pivot points. Values of the four pivots are then entered into the metadata structure (blocks indicated by 610), responsive to the For-Loop at lines 9-10 of the syntax shown in TABLE 1. Finally, in the For-Loop at lines 12-15 of the syntax, for each pivot point, the order of the equation defining the curve between the pivot point and the next pivot point is entered into the metadata structure (block 612), followed by a number of coefficients equal to one plus the order of the equation (block 614). This process repeats for the second and third LUTs (lut_reshape_id=1 and lut_reshape_id=2) (blocks 616, 618, 620 and 622).

Because the disclosed metadata structure is self-referential, it allocates data space only when it is needed. Furthermore, because the structure allows for non-linear equations, the transfer functions implemented from the metadata model the transfer function better than a linearly interpolated segmented function having the same number of pivot points.

The reshaping parameter syntax, shown in TABLE 1 defines multiple inverse transfer functions for use with an image essence, image sequence, group of pictures or picture. Each component (e.g. Y, Cb, Cr) of each picture, or of each sub-picture element, such as a slice or processing window, may specify one of these transfer functions in the metadata. The transfer function is specified as an index into the metadata structure formed by the syntax shown in TABLE 1. The syntax for specifying this index is shown in TABLE 2. This syntax allows for one to three indexes (e.g. Y, Cb, Cr) to be specified for each image data set (e.g. frame, slice or processing window). The following item is used in the syntax for specifying this index for a picture, or sub-picture element such as a slice or a processing window.

lut_reshape_index[c] specifies the index of the reshaping LUT function to use for color component c. The value of lut_reshape_index[c] ranges from 0 to 15. If lut_reshape_index[c] is not present, it is inferred to be equal to 0. As shown in FIG. 6B, an example reshaping ID metadata structure includes three values, Y_lut_index, Cb_lut_index and Cr_lut_index. Each value corresponds to one of the lut_reshape_ids shown in FIG. 6A.

Using the syntax of TABLEs 1 and 2, the LUTs may be defined for a relatively large number of video data sets and then one of the tables may be signaled for each data set by including the lut_reshape_index[c] in metadata for a picture data set or for a processing window data set. Thus, the metadata structure formed from the syntax shown in TABLEs 1 and 2 provides an efficient method for signaling transfer functions from the encoding system 100 to the decoding system 150.

The reshaping parameter syntax shown in TABLE 1 above can be signaled at the picture level as a part of the picture parameter set (PPS), at the group of pictures (GOP) level, at the sequence level as a part of the sequence parameter set (SPS) and/or video parameter set (VPS). It may also be included in the supplemental enhancement information (SEI) and/or video usability information (VUI) of a video data set. For example, the reshaping parameters of TABLE 1 that define the multiple transfer functions can be signaled at an SPS level and the particular functions to use for a particular data set (TABLE 2) can be signaled at the PPS, slice or processing window level. The syntax element data types shown are examples and can be changed based upon the precision and range of parameter values desired. The values are used in the computation of the transfer function and LUT values. Note that the signaling above effectively specifies "reshaping (or LUT) parameter sets" that can be defined. Alternatively, the above signaling is suitable for signaling below the picture level. In one example, a quad-tree partitioning of a picture can be signaled, and the reshaping LUT functions for each partition and/or for each component of each partition can be signaled using a lut_reshape_index[c] value as shown in TABLE 2.

The inverse reshaping operation above for one color component can be used to generate a LUT for mapping the input value x to the output value f(x), where f(x)=LUT(x), and x is used to index the value in the LUT table. More generally, the mapping operation can be given by f(x)=LUT (x+offset_1)+offset_2, where offset_1 is an input offset into the LUT and offset_2 is an output offset, applied to the output value of the LUT. These offsets have the effect of shifting the curves shown in FIG. 5 horizontally for offset_1 and vertically for offset_2. The values offset_1 and offset_2 are offset values that may be fixed or may be signaled for a given use case. These can be signaled for each segment of the transfer function or once for the entire transfer function. TABLE 3 shows an example syntax where offset_1 and offset_2 are signaled for a transfer function.

TABLE 3

| | Descriptor | No. |
|---|---|---|
| reshaping_parameters( ) { | | |
|   num_lut_reshape_greater1_flag | u(1) | 1 |
|   if ( num_lut_reshape_greater1_flag ) | | 2 |
|     num_lut_reshape_minus2 | u(4) | 3 |
|   for( k = 0; k < NumLutReshape; k++ ) { | | 4 |
|     if ( num_lut_reshape_greater1_flag ) { | | 5 |
|       lut_reshape_id | u(4) | 6 |
|     } | | 7 |
|     signal_reshape_num_pivots_minus2 [ k ] | u(3) | 8 |
|     for( i = 0; i < signal_reshape_num_pivots_minus2 [ k ] + 2 ; i++ ) { | | 9 |
|       signal_reshape_coded_pivot_value[ k ][ i ] | u(10) | 10 |
|     } | | 11 |
|     lut_offset_1[k] | se(v) | 12 |
|     lut_offset_2[k] | se(v) | 13 |
|     for( i = 0; i < signal_reshape_num_pivots_minus2 [ k ] + 1; i++ ) { | | 14 |
|       poly_order [ k ][ i ] | u(2) | 15 |
|       for( j = 0; j <= poly_order [ k ][ i ]; j++ ) { | | 16 |
|         poly_coef[ k ][ i ] [ j ] | se(v) | 17 |
|       } | | 18 |
|     } | | 19 |
|   } | | 20 |
| } | | 21 |

An example metadata structure generated using the syntax shown in TABLE 3 is shown in FIG. 7A. The first eight elements in the metadata structure are the same as those shown in FIG. 6A. The difference between FIGS. 6A and 7A are the values lut_offset_1 (block 702) and lut_offset_2 (block 704).

lut_offset_1[k] specifies an offset value for the input LUT value. This value is added to the input value x to obtain the LUT output value. The value of lut_offset_1[k] is a signed integer having a range between −1024 to +1023, inclusive.

lut_offset_2[k] specifies an offset value for the output LUT value. This value is added to the LUT output value to obtain the reshaped color component value (e.g. Y, Cb, Cr). The value of lut_offset_2[k] is a signed integer having a range between −1024 to +1023, inclusive.

In another example, the inverse reshaping operation for one color component can be based on an operation using a LUT based upon a function of another color component. One application of this is described in for HDR-SDR compatible invertible tone mapping. In this example, a chrominance channel inverse reshaping operation computes the chrominance output C_x based on the decoded chrominance input value C_x' multiplied by a value provided by a luminance LUT indexed by the cross channel luminance input Y' such that C_x=f(C_x')=LUT(Y/Y')*C_x' and the LUT is a ratio of the cross channel luminance output Y to Y'. The Y' is a co-located luminance input value that is used to index the luminance LUT. Examples of co-located luminance input values are given below. To indicate this inverse reshaping operation, the metadata structure may include elements to signal cross_channel_lut_scaling_flag[c] and cross_channel_lut_scaling_index[c] for the color components as shown below in TABLE 4. An example metadata structure produced using this syntax is shown in FIG. 7B. The reshaping id syntax shown in TABLE 4 and FIG. 7B may be used with the reshaping parameters shown in TABLE 1 or TABLE 3 and in FIGS. 6A and 7A, respectively. Although the transfer function applied in the cross-channel operation is shown as being LUT(Y/Y'), it is contemplated that other transfer functions may be used such as LUT(Cr/Y') or LUT(Cb/Y').

TABLE 4

| | Descriptor | No. |
|---|---|---|
| reshaping_id( ) { | | 1 |
|   for( c = 0; c < 3; c++ ) { | | |
|     lut_reshape_index[c] | u(4) | 2 |
|     cross_channel_lut_scaling_flag[c] | u(1) | 3 |
|     if (cross_channel_lut_scaling_flag[c]) | | 4 |
|       cross_channel_lut_scaling_index[c] | u(4) | 5 |
|   } | | 6 |
| } | | 7 | cross_channel_lut_scaling_flag[c] equal to 1 specifies that the inverse reshaping operation for color component c is performed using multiplication with the LUT given by lut_reshape_index[c] indexed by co-located channel cross_channel_lut_scaling_index[c]. Otherwise, cross_channel_lut_scaling_flag[c] is equal to 0 and the inverse reshaping operation for color component c is performed using the LUT given by lut_reshape_index[c] indexed by channel c.

cross_channel_lut_scaling_index[c] specifies the index of the color component for which to index the cross channel LUT inverse reshaping operation. When not present, the value of cross channel_lut_scaling_index[c] is inferred to be equal to c. The value of cross channel_lut_scaling_index[c] has a range between 0 and 2.

FIG. 7B shows an example metadata structure generated using the syntax of TABLE 4. This metadata structure may be associated with a picture or sub-picture element using transfer functions specified using the syntax shown in TABLE 6A or 7A. As shown in TABLE 7B, the index of the LUT to use for luminance data is in the cell indicated by block 706. Next, in block 708 the luminance cross channel flag is set to 1 indicating that block 710 includes data indicating the cross-channel component to use in the reshaping operation, in this case, 0 indicates the luminance channel. Block 712 holds the index of the LUT to use for the Cb chrominance component. For this component, the cross channel flag is 0 (block 714) indicating that cross-channel scaling is not used for the Cb chrominance component. Next, block 716 holds the LUT index for the Cr chrominance component. The Cr cross channel flag in block 718 indicates that the cross channel index to use for the Cr component is in block 720. In this case, this value is 0, indicating that the values for the co-located luminance component are to be used.

In another syntax example, the luminance LUT reshaping table index can be signaled (lut_reshape_index[0]), but the chrominance LUT reshaping table indices are signaled only if cross channel scaling is not used (cross channel_lut_scaling_flag=0). If cross channel scaling is used (cross channel_lut_scaling_flag=1), then the chrominance data is modified using the luminance LUT (lut_reshape_index[0]) indexed by the co-located luminance cross channel value to multiply with the input chrominance value (e.g. as described above), while the luminance data uses the luminance LUT indexed by the luminance value to multiply with the input luminance value. A syntax such as that shown in TABLE 5 can be used to specify the metadata for this reshaping operation.

TABLE 5

| | Descriptor | No. |
|---|---|---|
| Reshaping_id( ) { | | |
|   cross_channel_lut_scaling_flag | u(1) | 1 |
|   if ( num_lut_reshape_greater1_flag ) { | | 2 |
|     for( c = 0; c < 3; c++ ) { | | 3 |
|       if ( !cross_channel_lut_scaling_flag \|\| | | 4 |
|         c = = 0) | | |
|           lut_reshape_index[c] | u(4) | 5 |
|     } | | 6 |
|   } | | 7 |
| } | | 8 |

In TABLE 5, cross_channel_lut_scaling_flag equal to 1 specifies that the inverse reshaping operation for color component c is performed using multiplication with the LUT given by lut_reshape_index[0] indexed by the co-located luminance channel if num_lut_reshape_greater1_flag is equal to 1, or by the default LUT with lut_reshape_id equal to 0 if num_lut_reshape_greater1_flag is equal to 0. If cross_channel_lut_scaling_flag is equal to 0, the inverse reshaping operation for color component c is performed using the LUT given by lut_reshape_index[c] indexed by channel c if num_lut_reshape_greater1_flag is equal to 1, or by the default LUT with lut_reshape_id equal to 0 if num_lut_reshape_greater1_flag is equal to 0. FIG. 7C shows an example metadata structure that may be generated from the syntax of TABLE 5 when both cross channel_lut_scaling_flag is 0 and num_lut_reshape_greater1_flag is 1. In this case a distinct LUT is used to regenerate the HDR/WCG data for each color component (Y, Cb, Cr).

An example inverse reshaping process is as follows: For luminance inverse reshaping, inputs are a luminance location (i,j) and decoded luminance value Y'(i,j), and the output is a reshaped luminance value Y(i,j). If cross channel_lut_scaling_flag=1, then $$Y(i,j)=LUT\_Y(Y'(i'j'))*(Y'(i,j)+lut\_offset1)+lut\_offset2 \quad (3)$$

else $$Y(i,j)=LUT\_Y(Y'(i,j)+lut\_offset1)+lut\_offset2 \quad (4)$$

where LUT_Y is derived from Equation (2).

For chrominance inverse reshaping, inputs are a chrominance sample location (i,j), a decoded chrominance value C'(i,j) and decoded co-located luminance values Y'(i',j'). The output is a reshaped chrominance value C(i,j). If cross_channel_lut_scaling_flag=1, then $$C(i,j)=LUT\_C(Y'(i'j'))*(C'(i,j)+lut\_offset1)+lut\_offset2 \quad (5)$$

else $$C(i,j)=LUT\_C(C'(i,j)+lut\_offset1)+lut\_offset2 \quad (6)$$

where (i,j)=(i'/2,j'/2), and LUT_C is derived from Equation (2).

In another example, for the case of the second variant of the Weber law, where $$LUT(x) = \frac{(CN+1)^x - 1}{CN} \quad (7)$$

and CN is the maximum contrast ratio, the polynomial approximation for LUT(x/x') has f(x) with signal_reshape_num_pivots_minus2[k]=0 and polynomial coefficients, $a_{ij}$, are determined by Equation (8).

$$a_{ij} = \frac{(\ln(CN+1))^{j+1}}{CN(j+1)!} \quad (8)$$

In order to reduce computation of these parameters, it is possible to change the log base (e.g. base 2) as well as to perform scaling of the coefficients.

In the example of cross channel scaling, for subsampled chrominance data, the co-located luminance value can be chosen to be a function of neighboring luminance values, e.g. average, minimum, maximum, or median. For example, for 4:2:0 subsampling, an average of the nearest four luminance sample values can be used. Also, since the visual response at a given luminance location is also a function of neighboring luminance values, a filtering operation of a neighborhood of luminance values (e.g. bilinear, nonseparable, or separable filtering) can be used. A flag can be signaled to indicate a mapping function or operation to use for determining the co-located luminance value.

For a chrominance channel inverse reshaping operation that includes multiplication with the luminance channel, the noise introduced from the luminance channel may be a multiplicative noise in the form of $$LUT(x_i)=LUT(x+n_i) \quad (9)$$

where x is the original signal, and $n_i$ is the noise added after quantization for luminance sample $x_i$. The reshaped chrominance channel signal at decoder side is C_x=f(C_x')=LUT (x+n)*C_x' if no subsampling applied. For the 4:2:0 subsampling case, suppose m co-located luminance samples are used during subsampling, it would be desirable to reduce the multiplicative noise with approximation as below:

$$\overline{LUT(x)}=(\Pi_{i=0}^{m-1}LUT(x_i))^{1/m} \quad (10)$$

where C_x=$\overline{LUT(x)}$*C_x'.

If a log-like (e.g. log 2) function is applied in Equation (10), the corresponding operation with 1/m could be computed with right shift when m=4. The parameters in the LUT can also be designed to be multiples of two to simplify computation operations.

Although the materials above specify two parameters for segments of the transfer function modeled by linear equations, three parameters for segments modeled by quadratic equations and four parameters for segments modeled by cubic equations, it is proposed that the number of parameters to signal or specify per segment may be reduced based upon conditions imposed on the segments.

An $M_i$ order polynomial for the piecewise function $f_i(x)$ is specified by $M_i+1$ parameters $a_{ij}$, where $0<=j<=M_i$. However, if constraints are imposed on the function, the number of independent parameters may be reduced by the number of constraints. An example of a reasonable constraint on the piecewise functions is to require that the overall function be continuous at the internal segment boundaries (excluding first and last boundaries). Another constraint may be to require that the (extended) piecewise functions have the same slope at the boundaries.

For the example of piecewise functions that are second order ($M_i=2$), if the segment boundaries are constrained to be continuous, then it is possible to reduce the number of parameters to be signaled in the piecewise functions by 1. One way to achieve this is to first signal the i=0 segment function parameters $a_{00}$, $a_{01}$, $a_{02}$, $x_0$, and $x_1$. For the i=1 segment, however, only the parameters $a_{11}$, $a_{12}$ and $x_2$ need to be signaled, as $a_{10}$ can be computed based on previous parameters as $a_{10}=f_0(x_1)$. Likewise, for the i=2 segment, only $a_{21}$, $a_{22}$ and $x_3$ need to be signaled, etc. In general, for the i_th segment (i>=1), $a_{i0}$ need not be signaled but can be computed from $a_{i0}=f_{i-1}(x_i)$.

For the case of second order polynomial segments that are both continuous and smooth (same slope across boundaries) at internal segment boundaries, it is possible to reduce the number of parameters to be signaled for the piecewise function by 2. In one example, the i=0 segment function parameters $a_{00}$, $a_{01}$, $a_{02}$, $x_0$, and $x_1$ are first signaled. For the i=1 segment, only $a_{12}$ and $x_2$ need to be signaled, as $a_{10}$ can be computed based on previous parameters as $a_{10}=f_0(x_1)$ and $a_{11}$ can be computed as $a_{11}=a_{01}+2a_{02}(x_1-x_0)$. In general, for the i_th segment (i>=1), $a_{i0}$ and $a_{i1}$ can be computed as $$a_{i0}=f_{i-1}(x_i) \quad (11)$$

$$a_{i1}=a_{i-1,1}+2a_{i-1,2}(x_i-x_{i-1}). \quad (12)$$

A corresponding example syntax to signal the parameters for this case is shown in TABLE 6 below and an example metadata structure resulting from the syntax is illustrated in FIG. 8.

TABLE 6

| | Descriptor | No. |
|---|---|---|
| reshaping_parameters( ) { | | |
| num_lut_reshape_greater1_flag | u(1) | 1 |
| if ( num_lut_reshape_greater1_flag ) | | 2 |
| num_lut_reshape_minus2 | u(4) | 3 |
| for( k = 0; k < NumLutReshape; k++ ) { | | 4 |
| if ( num_lut_reshape_greater1_flag ) { | | 5 |
| lut_reshape_id | u(4) | 6 |
| } | | 7 |
| signal_reshape_num_pivots_minus2 [k] | u(3) | 8 |
| for( i = 0; i < | | 9 |
| signal_reshape_num_pivots_minus2 [k] + 2 ; | | |
| i++ ) { | | |
| signal_reshape_coded_pivot_value[k][i] | u(10) | 10 |
| } | | 11 |
| lut_offset_1[k] | se(v) | 12 |
| lut_offset_2[k] | se(v) | 13 |
| for( j = 0; j <= 2; j++ ) { | | 14 |
| poly_coef[k][0] [j] | se(v) | 15 |
| } | | 16 |
| for( i = 1; i < | | 17 |
| signal_reshape_num_pivots_minus2 [k] + 1; | | |
| i++ ) { | | |
| poly_coef[k][i] [2] | se(v) | 18 |
| } | | 19 |
| } | | 20 |
| } | | 21 |

As described above, higher order polynomials can be used for the segments. For example, for an $M_i$ order polynomial specified by $M_i+1$ parameters, if two constraints are imposed (e.g. continuity and slope at boundary), only $M_i-1$ parameters need to be signaled for all but the first segment, as the other two parameters can be derived from the constraints on the previous segments. Higher order polynomials can allow more freedom to match a desired TF. In the event that continuity or slope is not constrained at a boundary for a segment, then all parameters of the polynomial can be signaled for the segment, while additional segments with boundary constraints can have fewer parameters signaled. Other examples can include mixed order polynomial segments, where the constraints imposed reduce the number of parameters to be signaled. Also, while the i=0 segment parameter set was first signaled, in other examples a different segment parameter set can be signaled from which the other parameters are computed. In another example, instead of specifying the boundary values $x_i$ (pivots), it is also possible to signal the $f(x_i)$ values instead. These values and parameters can be chosen to be uniformly spaced or multiples of two to simplify computation operations.

FIG. 8 shows an example metadata structure that may be generated using the syntax shown in TABLE 6. This structure is similar to the structure shown in FIG. 7A except that all equations are assumed to be quadratic and fewer coefficients are entered. As shown in blocks 802, 804, and 806, three coefficients are specified for the first segment. However, for the second and third segments, only the last coefficient (coefficient 2 in blocks 808 and 810) is specified. This is because coefficients 0 and 1 may be calculated from the endpoint and slope of the previous segment at the common pivot point.

While the examples have been described above in connection with specific devices, apparatus, systems, syntaxes and/or methods, it is to be clearly understood that this description is made only by way of example and not as limitation. Particular embodiments, for example, may be implemented in a non-transitory computer-readable storage medium for use by or in connection with an instruction execution system, apparatus, system, or machine. The computer-readable storage medium contains instructions for controlling a computer system to perform a method or to hold a metadata structure as described by particular embodiments. The instructions, when executed by one or more computer processors, may be operable to perform that which is described in particular embodiments.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented, and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. Accordingly, the specification and figures are to be regarded in an illustrative rather than a restrictive sense, and all such modifications are intended to be included within the scope of the claims. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. A method comprising:
    encoding video data, including:
        generating a first metadata structure to describe a transfer function to be applied to reshape decoded video data to generate output video data having at least one of a higher dynamic range or wider color gamut than the decoded video data, the first metadata structure being associated with a sequence of pictures, a group of pictures, or an image essence of the video data, the generating of the first metadata structure including:
            dividing data representing the transfer function into a number of segments the segments being defined by pairs of successive pivot points of a number, P, pivot points including a first pivot point and a last pivot point, P being an integer;
            allocating a cell in the first metadata structure to store a value indicating the number of pivot points and storing the value P in the allocated cell;
            allocating P pivot point cells in the first metadata structure;
            storing data values representing the P pivot points into the P pivot point cells;
            fitting a respective equation to each segment, each equation having a number, N, coefficient values where N is an integer that varies based on characteristics of the segment; and
            for each pivot point except the last pivot point:
                allocating N+1 cells in the first metadata structure;
                storing the value N for the segment into a first one of the N+1 cells; and
                storing the N coefficient values in the remaining N cells of the N+1 cells;
            wherein the equations defining the segments are restricted such that an end point of the equation defining each segment except a last segment is a starting point for the equation defining the next successive segment, and
            wherein the equations defining the segments are further restricted such that a slope of the equation defining each segment, except the first segment, matches a slope of the equation defining a previously adjacent segment at the pivot point where the segment and the previously adjacent segment meet,
            for each segment, N is an integer equal to the order of the equation fitted to the segment minus 1; and
        generating a second metadata structure associated with a picture, slice, processing window or sub-picture element, including allocating a cell in the second metadata structure and storing, in the allocated cell of the second metadata structure data identifying the transfer function; and
    encoding the video data and including the first and second metadata structures with the encoded video data.

2. The method of claim 1 further comprising:
    allocating a first offset cell and a second offset cell in the first metadata structure;
    storing, in the first offset cell, a first offset value to be added to input data before the input data is applied to the transfer function; and
    storing, in the second offset cell, a second offset value to be added to output data resulting from the input data being applied to the transfer function.

3. The method of claim 1, wherein the transfer function is a first transfer function, the method further comprising:
    adding metadata describing a second transfer function to the first metadata structure, including:
        dividing data representing the second transfer function into a number of segments the number of segments being defined by Q pivot points including a first pivot point and a last pivot point, Q being an integer different than P;
        allocating a cell in the first metadata structure to store a value indicating the number of pivot points and storing the value Q in the allocated cell;
        allocating Q pivot point cells in the first metadata structure;
        storing data values representing the Q pivot points into the Q pivot point cells;
        fitting an equation to each segment, each equation having a number, N, coefficient values where N is an integer that varies based on characteristics of the segment;
        for each pivot point except the last pivot point:
            allocating N+1 cells in the first metadata structure;
            storing the value N for the segment into a first one of the N+1 cells;
            storing the N coefficient values in the remaining N cells of the N+1 cells;
    wherein the data stored in the allocated cell of the second metadata structure indicates one of the first transfer function or the second transfer function based on characteristics of the picture, slice, processing window or sub-picture element.

4. The method of claim 1, wherein:
    the equations defining the segments are restricted such that the end point of the equation defining each segment except a last segment is a starting point for the equation defining the next successive segment; and
    for each segment, N is an integer equal to an order of the equation fitted to the segment.

5. The method of claim 1, wherein:
    the decoded video data includes a luminance component and first and second chrominance components;
    the transfer function represents a function Y/Y', where Y' is luminance component of the decoded video data and Y is a corresponding luminance component having at least one of the higher dynamic range or wider color gamut than the decoded video data; and
    the method further includes:
        allocating a flag cell in the second metadata structure and storing in the flag cell a data value indicating cross-channel scaling;
        for each chrominance component:
            allocating a transfer function identification cell; and
            storing, in the transfer function identification cell data identifying a transfer function to be used for the chrominance component.

6. Apparatus comprising:
    a memory configured as a look-up table (LUT);
    a video decoding system configured to receive a bit stream representing an encoded video signal, the video decoding system including program instructions that cause the video decoding system to:

decode the bit stream to produce decoded video data;
extract a first metadata structure from a sequence, group of pictures or image essence of the bit stream;
extract, from the first metadata structure, data representing a number of pivot points, P, and, for each pivot point, except the $P^{th}$ pivot point, a respective number of coefficients, N, where N and P are integers;
extract, from the first metadata structure, the P pivot points and the N coefficients for each pivot point except for the $P^{th}$ pivot point;
regenerate, from the extracted pivot points and coefficients, a transfer function including P−1 transfer function segments corresponding to the P pivot points except for the $P^{th}$ pivot point;
generate first and second additional coefficients for each pivot point except the first pivot point and the last pivot point, the first additional coefficient corresponding to the value, at the pivot point, of the transfer function segment corresponding to the previous pivot point and the second coefficient corresponding to a slope, at the pivot point, indicated by the coefficients associated with the previous pivot point;
generate data values and store the regenerated data values in the LUT responsive to the regenerated transfer function;
extract a second metadata structure from a picture, slice, processing window or sub-picture element from the bit stream;
extract an identifier of the transfer function from the second metadata structure;
generate reshaped video data as an output of the LUT by applying decoded video data corresponding to the picture, slice, processing window or sub-picture element as an input to the LUT.

7. The apparatus of claim 6, wherein the program instructions further cause the decoding system to:
extract a first offset value and a second offset value from the first metadata structure; and
add the first offset value to the decoded video data before applying the decoded video data to the LUT; and
add the second offset value to the output data provided by the LUT.

8. The apparatus of claim 6, wherein:
the memory is configured as a first LUT and a second LUT and the transfer function is a first transfer function and is used to generate the data values in the first LUT; and
the program instructions cause the decoding system to:
extract, from the first metadata structure, data representing a number of pivot points, Q, and, for each pivot point, except the $Q^{th}$ pivot point, a respective number of coefficients, N, where Q is an integer;
extract, from the first metadata structure, data representing the Q pivot points and the N coefficients for each pivot point;
regenerate a transfer function from the extracted Q pivot points and respective coefficients;
generate data values and store the regenerated data values in the second LUT responsive to the regenerated transfer function.

9. The apparatus of claim 6, wherein the program instructions further cause the decoding system to generate an additional coefficient for each pivot point except the first pivot point and the last pivot point, the additional coefficient corresponding to the value, at the pivot point, of the transfer function segment corresponding to the previous pivot point.

10. The apparatus of claim 6, wherein the program instructions further cause the decoding system to:
extract a cross-channel scaling flag from the second metadata structure; and
responsive to the cross-channel scaling flag, the program instructions cause the decoder to:
extract, from the second metadata structure, a cross-channel LUT scaling index for each chrominance channel of the decoded video signal; and
generate reshaped chrominance data by applying decoded luminance data corresponding to the decoded chrominance data to an LUT indicated by the cross-channel LUT scaling index and multiplying the decoded chrominance data by output data produced by the LUT to produce the reshaped chrominance data.

11. The apparatus of claim 10, wherein the program instructions further cause the decoding system to:
extract first and second offset values from the first metadata structure; and
add the first offset value to the decoded chrominance data before applying the decoded luminance data to the LUT; and
add the second offset value to output data produced by the LUT to generate the reshaped chrominance data.

12. Apparatus comprising:
a memory configured to hold an encoded video bit stream, the bit stream including first and second metadata structures;
an encoding system for encoding video data, the encoding system, including program instructions that cause the encoding system to generate the first metadata structure to describe a transfer function to be applied to reshape decoded video data to produce output video data having at least one of a higher dynamic range or wider color gamut than the decoded video data, the first metadata structure being associated with a sequence of pictures, a group of pictures, or an image essence, wherein the program instructions cause the encoding system to:
divide data representing the transfer function into a number of segments the segments being defined by successive pivot points of a number, P, pivot points including a first pivot point and a last pivot point, P being an integer;
allocate a cell in the first metadata structure to store a value indicating the number of pivot points and storing the value P in the allocated cell;
allocate P pivot point cells in the first metadata structure;
store data values representing the P pivot points into the P pivot point cells;
fit a respective equation to each segment, each equation having a number, N, coefficient values where N is an integer that varies based on characteristics of the segment; and
for each pivot point except the last pivot point:
allocate N+1 cells in the first metadata structure;
store the value N for the segment into a first one of the N+1 cells; and
store the N coefficient values in the remaining N cells of the N+1 cells;
wherein the equations defining the segments are restricted such that an end point of the equation defining each segment except a last segment is a starting point for the equation defining the next successive segment, and wherein the equations defining the segments are further restricted such that a slope of the equation defining each segment, except the first segment, matches a slope of the equation defining a previously adjacent segment at the pivot point where the segment and the previously adjacent segment meet, and for each segment, N is an integer equal to the order of the equation fitted to the segment minus 1;

generate a second metadata structure associated with a picture, slice, processing window or sub-picture element of the video data, including instructions that cause the encoder to allocate a cell in the second metadata structure and to store, in the allocated cell of the second metadata structure data identifying the transfer function; and encode the video data and including the first and second metadata structures with the encoded video data in the bit stream.

13. The apparatus of claim 12, wherein the program instructions further cause the encoding system to:

allocate a first offset cell and a second offset cell in the first metadata structure;

store, in the first offset cell, a first offset value to be added to input data before the input data is applied to the transfer function; and store, in the second offset cell, a second offset value to be added to output data resulting from the input data being applied to the transfer function.

14. The apparatus of claim 12, wherein the transfer function is a first transfer function, the program instructions further cause the encoding system to:

add metadata describing a second transfer function to the first metadata structure, including instructions that cause the encoder to:

divide data representing the second transfer function into a number of segments the number of segments being defined by Q pivot points including a first pivot point and a last pivot point, Q being an integer different than P;

allocate a cell in the first metadata structure to store a value indicating the number of pivot points and storing the value Q in the allocated cell;

allocate Q pivot point cells in the first metadata structure;

store data values representing the Q pivot points into the Q pivot point cells;

fit an equation to each segment, each equation having a number, N, coefficient values where N is an integer that varies based on characteristics of the segment;

for each pivot point except the last pivot point:
allocate N+1 cells in the first metadata structure;
store the value N for the segment into a first one of the N+1 cells;
store the N coefficient values in the remaining N cells of the N+1 cells;

wherein the data stored in the allocated cell of the second metadata structure indicates one of the first transfer function or the second transfer function based on characteristics of the picture, slice, processing window or sub-picture element.

15. The apparatus of claim 12, wherein:

the equations defining the segments are restricted such that the an end point of the equation defining each segment except a last segment is a starting point for the equation defining the next successive segment; and for each segment, N is an integer equal to an order of the equation fitted to the segment.

16. The apparatus of claim 12, wherein:

the decoded video data includes a luminance component and first and second chrominance components;

the transfer function represents a function Y/Y', where Y' is luminance component of the decoded video data and Y is a corresponding luminance component having at least one of the higher dynamic range or wider color gamut than the decoded video data; and the program instructions cause the encoder to:

allocate a flag cell in the second metadata structure and storing in the flag cell a data value indicating cross-channel scaling;

for each chrominance component:
allocate a transfer function identification cell; and
store, in the transfer function identification cell data identifying a transfer function to be used for the chrominance component.

17. A non-transitory computer-readable medium including program instructions that cause a processor to:

decode an encoded video bit stream to produce decoded video data;

extract a first metadata structure from a sequence, group of pictures or image essence of the bit stream;

extract, from the first metadata structure, data representing a number of pivot points, P, and, for each pivot point, except the $P^{th}$ pivot point, a respective number of coefficients, N, where N and P are integers;

extract, from the first metadata structure, the P pivot points and the N coefficients for each pivot point except for the $P^{th}$ pivot point;

regenerate, from the extracted pivot points and coefficients, a transfer function including P−1 transfer function segments corresponding to the P pivot points except for the $P^{th}$ pivot point;

generate first and second additional coefficients for each pivot point except the first pivot point and the last pivot point, the first additional coefficient corresponding to the value, at the pivot point, of the transfer function segment corresponding to the previous pivot point and the second coefficient corresponding to a slope, at the pivot point, indicated by the coefficients associated with the previous pivot point;

generate data values and store the regenerated data values in the LUT responsive to the regenerated transfer function;

extract a second metadata structure from a picture, slice, processing window or sub-picture element from the bit stream;

extract an identifier of the transfer function from the second metadata structure;

generate reshaped video data as an output of the LUT by applying decoded video data corresponding to the picture, slice, processing window or sub-picture element as an input to the LUT.

* * * * *